(12) United States Patent
Kreitzer (10) Patent No.: US 6,476,974 B1
(45) Date of Patent: Nov. 5, 2002

(54) PROJECTION LENSES FOR USE WITH REFLECTIVE PIXELIZED PANELS

(75) Inventor: Melvyn H. Kreitzer, Cincinnati, OH (US)

(73) Assignee: Corning Precision Lens Incorporated, Cincinnati, OH (US)

( * ) Notice: Subject to any disclaimer, the term of this patent is extended or adjusted under 35 U.S.C. 154(b) by 37 days.

(21) Appl. No.: 09/797,018

(22) Filed: Feb. 28, 2001

(51) Int. Cl.[7] .............................. G02B 9/60; G02B 9/62; G02B 13/04

(52) U.S. Cl. .................. 359/649; 359/752; 359/753; 359/762; 359/770

(58) Field of Search ............................ 359/649, 650, 359/651, 752, 753, 762, 770

(56) References Cited

U.S. PATENT DOCUMENTS

| 5,218,480 A | 6/1993 | Moskovich |
| 5,313,330 A | 5/1994 | Betensky |
| 5,625,495 A | 4/1997 | Moskovich |
| 5,625,738 A | 4/1997 | Magarill |
| 5,870,228 A | 2/1999 | Kreitzer et al. |
| 5,900,987 A | 5/1999 | Kreitzer |
| 5,900,989 A | 5/1999 | Kreitzer |
| 5,963,375 A | 10/1999 | Kreitzer |
| 5,969,874 A | 10/1999 | Moskovich |
| 6,008,952 A | * 12/1999 | Yamamoto ................ 359/683 |
| 6,275,343 B1 | * 8/2001 | Takamoto et al. .......... 359/749 |

FOREIGN PATENT DOCUMENTS

| WO | WO 98/34134 | 8/1998 |
| WO | WO 99/08138 | 2/1999 |
| WO | WO 00/67059 | 11/2000 |

* cited by examiner

*Primary Examiner*—Scott J. Sugarman
(74) *Attorney, Agent, or Firm*—Maurice M. Klee (57) ABSTRACT

Projection lenses (13) for use with pixelized panels (PP) are provided. The projection lenses have a negative first unit (U1) which has at least one aspheric surface and a positive second unit (U2) which has three subunits ($U_{S1}$, $U_{S2}$, $U_{S3}$) which have a positive/negative/positive configuration. The lens' aperture stop (AS) is located at the short conjugate end of the lens and is either in the third subunit ($US_3$) or close to that subunit. The lenses are particularly well-suited for use in the manufacture of compact projection systems which employ side illumination of a reflective pixelized panel.

17 Claims, 5 Drawing Sheets

PROJECTION LENSES FOR USE WITH REFLECTIVE PIXELIZED PANELS

FIELD OF THE INVENTION

This invention relates to projection lenses and, in particular, to projection lenses for use in forming a large image of a small reflective object composed of pixels, such as, a reflective liquid crystal display (LCD), a digital mirror device (DMD), or the like.

BACKGROUND OF THE INVENTION

Projection lens systems (also referred to herein as "projection systems") are used to form an image of an object on a viewing screen. Such systems can be of the front projection or rear projection type, depending on whether the viewer and the object are on the same side of the screen (front projection) or on opposite sides of the screen (rear projection). The projection lenses of the present invention are specifically tailored for use in very compact front projectors, where the projected image emerges from the projector and is sent onto an external wall or screen.

To achieve a high level of compactness, the illumination for such front projectors is preferably fed in from the side near the object end (short conjugate end) of the projection lens. In the case of DMDs, the pixelized panel is also offset in order to provide the appropriate illumination geometry and to allow the dark-field light to miss the entrance pupil of the lens. This dark-field light corresponds to the off position of the pixels of the DMD.

Figure 1:
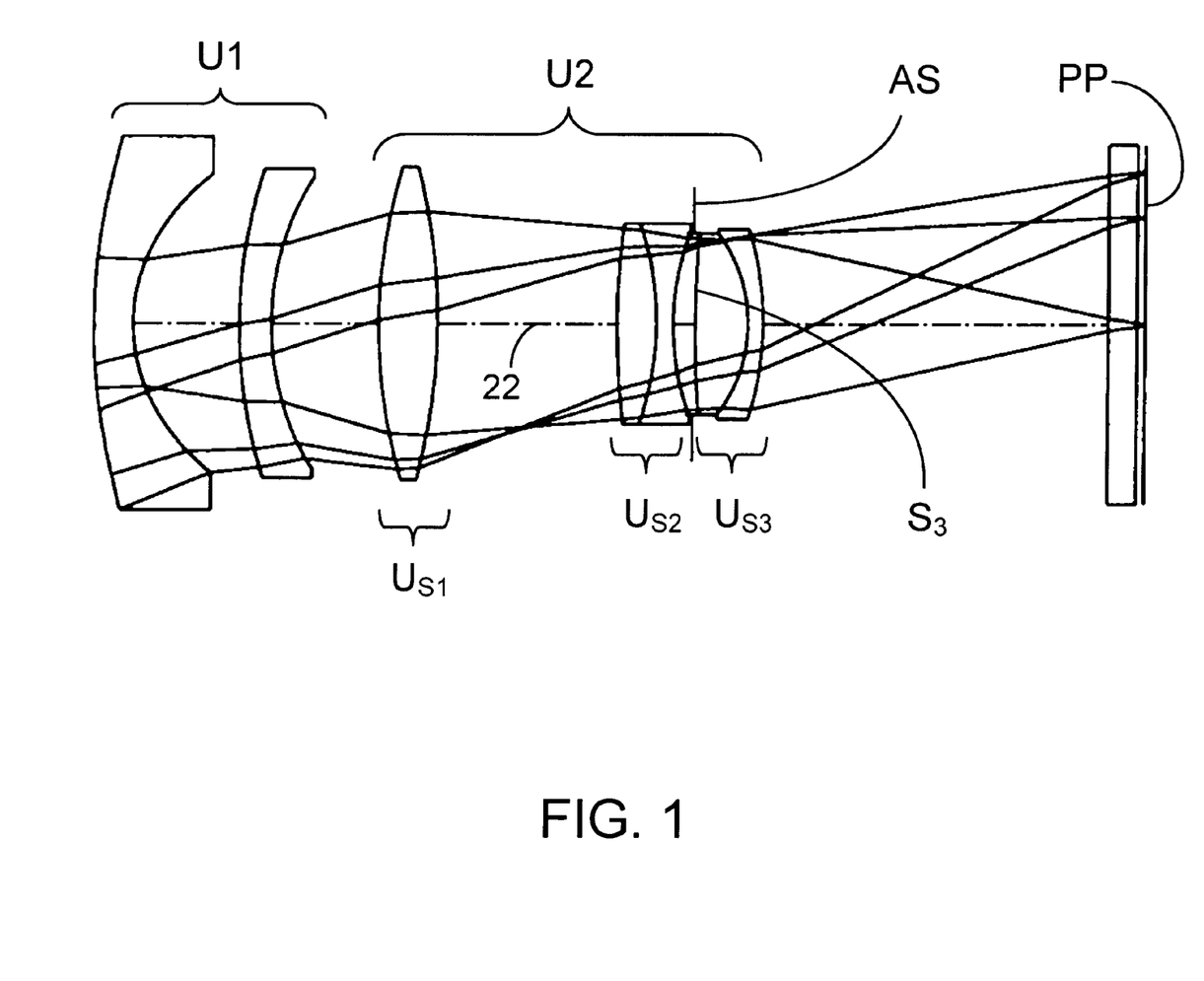
FIGS. 1–4 are schematic side views of representative projection lenses constructed in accordance with the invention.
Figure 2:
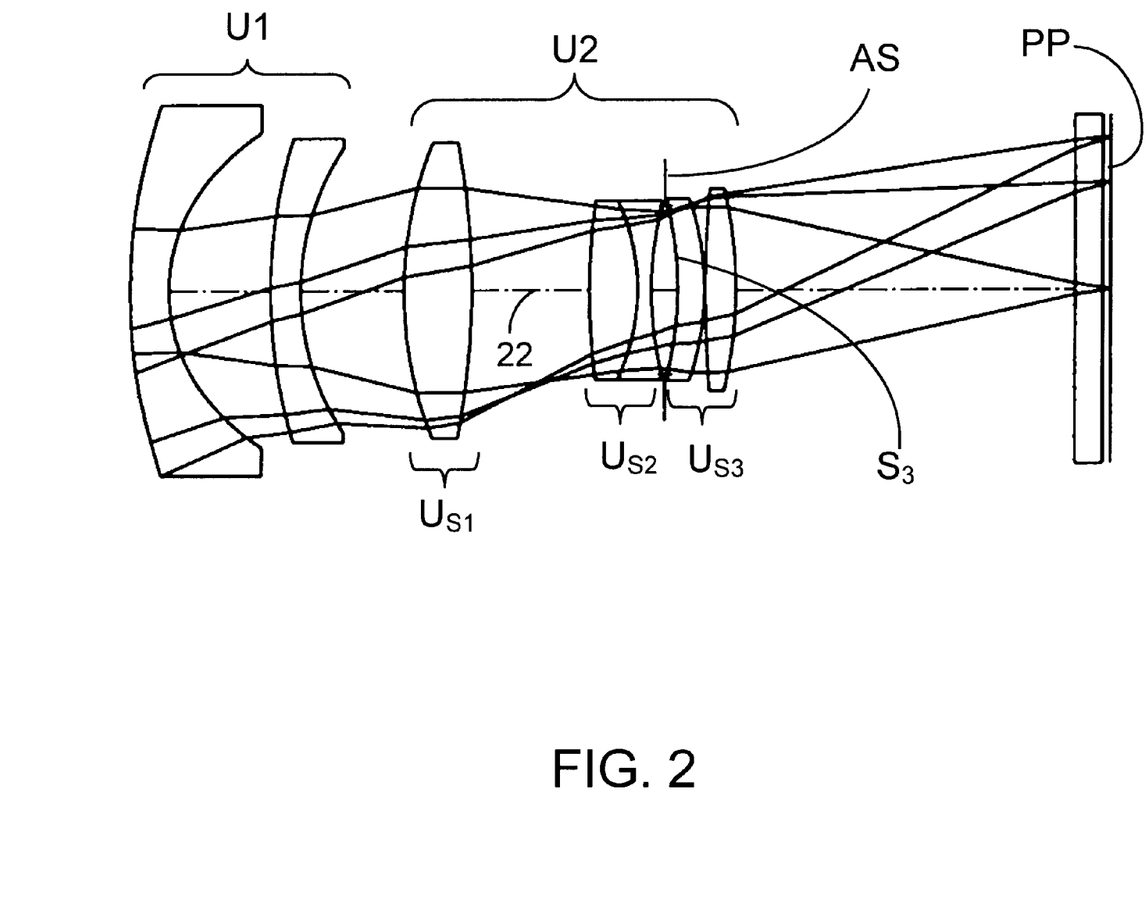
Figure 3:
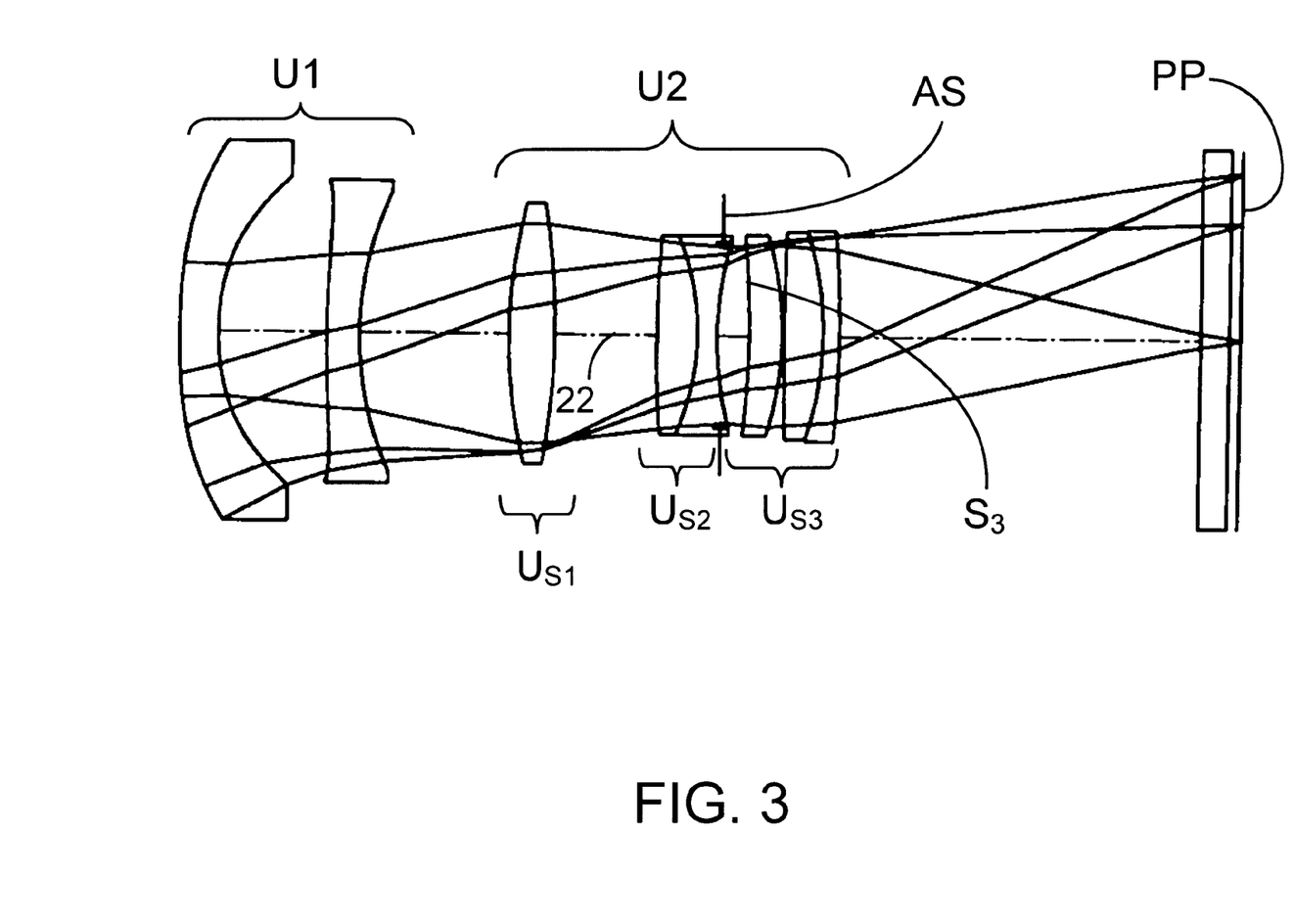
Figure 4:
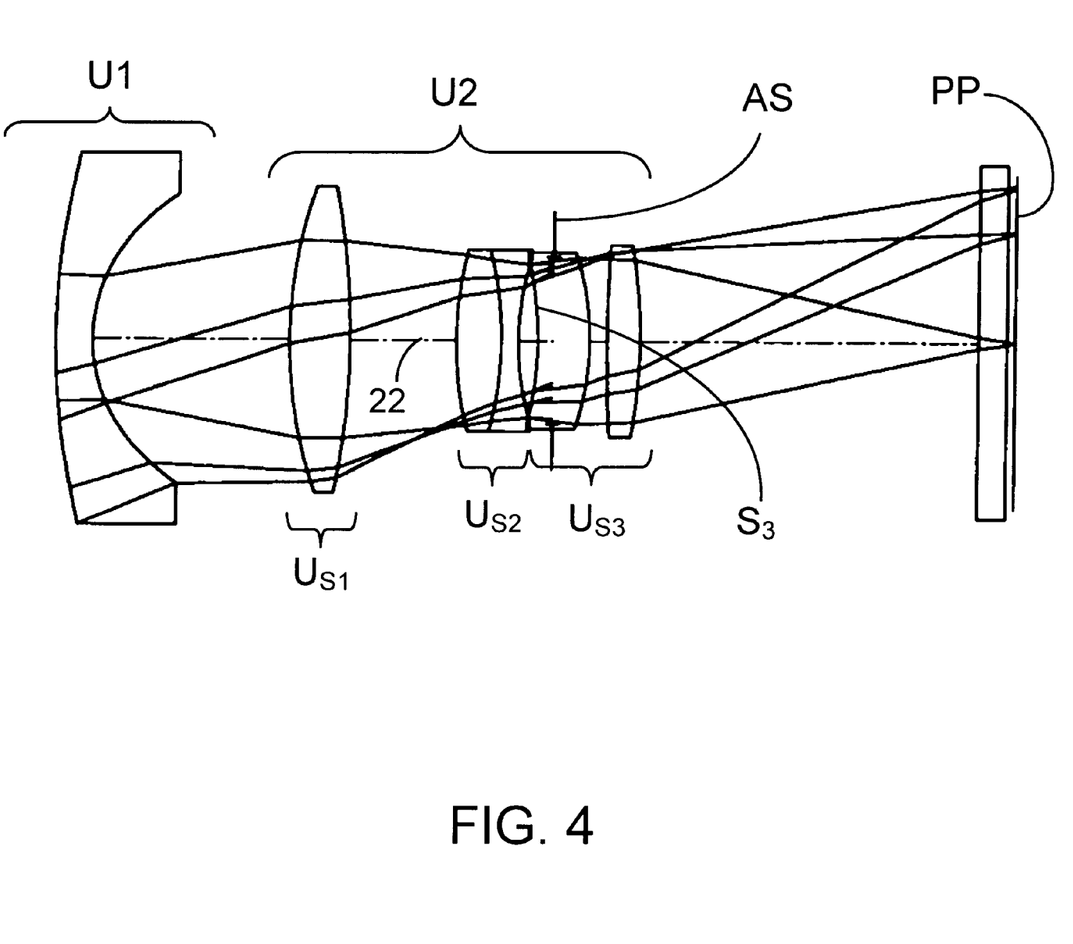
Figure 5:
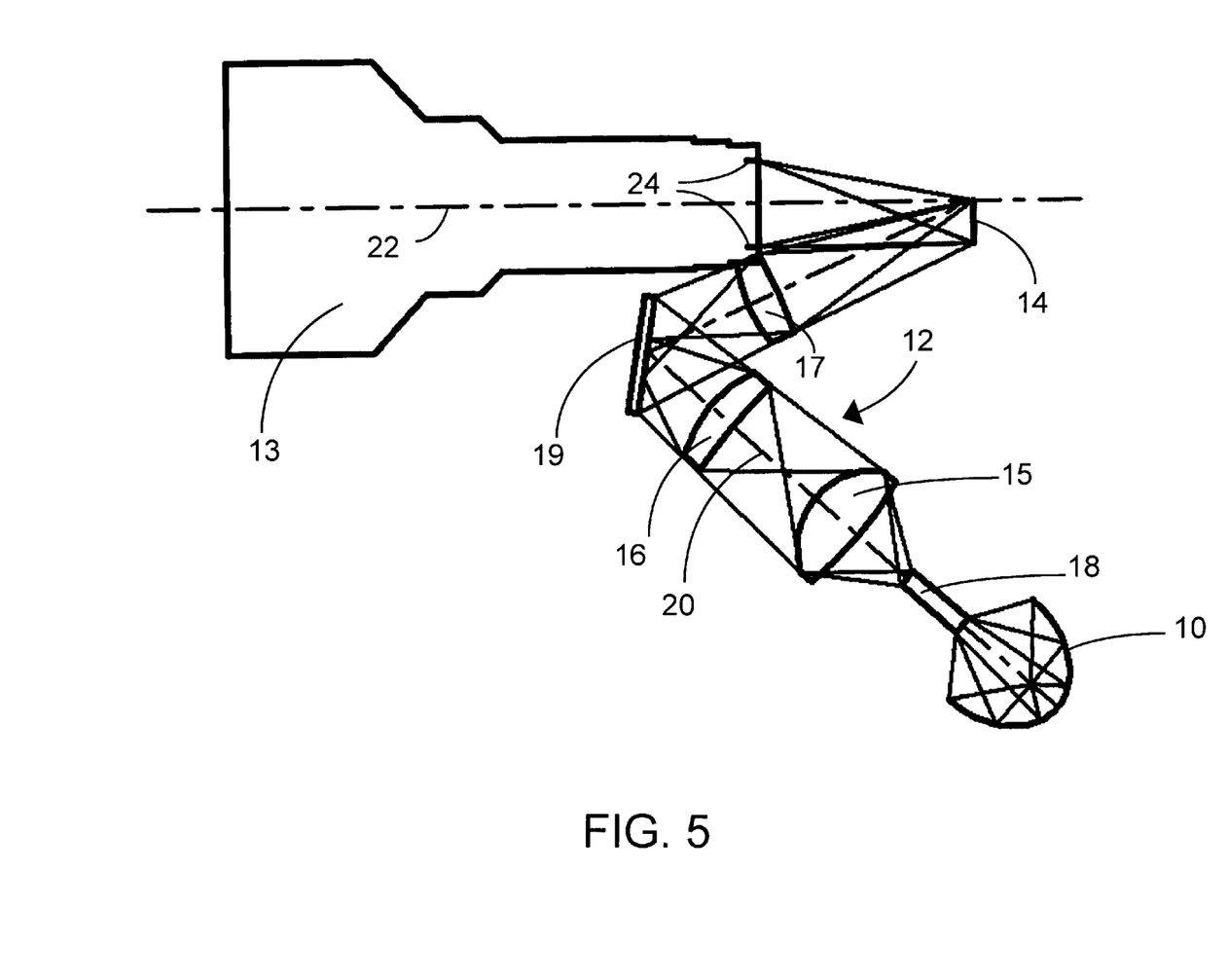
FIG. 5 is a schematic diagram showing an overall projection lens system in which the projection lenses of the present invention can be used.

The basic structure of such a system is shown in FIG. 5, where 10 is a light source (e.g., a metal halide or a high pressure mercury vapor lamp), 12 is illumination optics which forms an image of the light source (the "output" of the illumination system), 14 is the object which is to be projected (e.g., a Texas Instruments DMD of on and off pixels), and 13 is a projection lens, composed of multiple lens elements, which forms an enlarged image of object 14 on a viewing screen (not shown).

As shown in FIG. 5, the illumination optics can include multiple lens elements 15, 16, 17, a light tunnel 18 (e.g., a light tunnel constructed in accordance with commonly-assigned U.S. Pat. No. 5,625,738), and a mirror 19 for folding the optical axis 20 of the illumination system and thus reduce the overall size of the projector. As also shown in this figure, the optical axis 20 of the illumination system intersects the optical axis 22 of projection lens 13 at an acute angle.

Projection lens systems in which the object is a pixelized panel are used in a variety of applications. Such systems preferably employ a single projection lens which forms an image of either a single panel which is used to produce red, green, and blue images or of three panels, one for red light, a second for green light, and a third for blue light. In either case, projection lenses used with such systems generally need to have a relatively long back focal length to accommodate the auxiliary optical systems, such as color wheels, beam splitters, etc., normally used with pixelized panels.

A particularly important application of projection lens systems employing pixelized panels is in the area of microdisplays, e.g., front projection systems which are used to display data. Recent breakthroughs in manufacturing technology has led to a rise in popularity of microdisplays employing digital light valve devices such as DMDs, reflective LCDs, and the like.

Projection displays based on these devices offer advantages of small size and light weight. As a result, a whole new class of ultra portable lightweight projectors operating in front-projection mode and employing digital light valves has appeared on the market.

To display images having a high information content, these devices must have a large number of pixels. Since the devices themselves are small, the individual pixels are small, a typical pixel size ranging from 14–17 $\mu$ for DMD displays to approximately 8 $\mu$ or even less for reflective LCDs. This means that the projection lenses used in these systems must have a very high level of correction of aberrations. Of particular importance is the correction of chromatic aberrations and distortion.

A high level of chromatic aberration correction is important because color aberrations can be easily seen in the image of a pixelized panel as a smudging of a pixel or, in extreme cases, the complete dropping of a pixel from the image. These problems are typically most severe at the edges of the field.

All of the aberrations of the system need to be addressed, with lateral color, chromatic variation of coma, astigmatism, and distortion typically being most challenging. Lateral color, i.e., the variation of magnification with color, is particularly troublesome since it manifests itself as a decrease in contrast, especially at the edges of the field. In extreme cases, a rainbow effect in the region of the full field can be seen.

In projection systems employing cathode ray tubes (CRTs) a small amount of (residual) lateral color can be compensated for electronically by, for example, reducing the size of the image produced on the face of the red CRT relative to that produced on the blue CRT. With a pixelized panel, however, such an accommodation cannot be performed because the image is digitized and thus a smooth adjustment in size across the full field of view is not possible. A higher level of lateral color correction, including correction of secondary lateral color, is thus needed from the projection lens.

The use of a pixelized panel to display data leads to stringent requirements regarding the correction of distortion. This is so because good image quality is required even at the extreme points of the field of view of the lens when viewing data. As will be evident, an undistorted image of a displayed number or letter is just as important at the edge of the field as it is at the center. Moreover, projection lenses are often used with offset panels. In such a case, the distortion at the viewing screen does not vary symmetrically about a horizontal line through the center of the screen but can increase monotonically from, for example, the bottom to the top of the screen. This effect makes even a small amount of distortion readily visible to the viewer.

Low distortion and a high level of color correction are particularly important when an enlarged image of a WINDOWS type computer interface is projected onto a viewing screen. Such interfaces with their parallel lines, bordered command and dialog boxes, and complex coloration, are in essence test patterns for distortion and color. Users readily perceive and object to even minor levels of distortion or color aberration in the images of such interfaces.

The above-mentioned microdisplays and, in particular, microdisplays employing DMDs, typically require that the light beam from the illumination system is fed in from the side near the short conjugate side of the projection lens (see the discussion of FIG. 5 above). This leads to a requirement that the entrance pupil 24 of the projection lens 13 is located at or near the lens' short conjugate side or, equivalently, that the lens' aperture stop is located near the short conjugate side. Such a location for the aperture stop exacerbates the optical design problem. In particular, the nearly external entrance pupil means that there is almost no internal lens symmetry for facilitating the correction of "odd" optical aberrations such as lateral color and coma. (Note that the nearly external entrance pupil can have the advantage of reducing heat buildup within the lens during operation.)

In addition to the foregoing, there is an ever increasing demand for greater compactness of projection lens systems. In terms of the projection lens, this translates into a requirement that the lens has a wide field of view in the direction of the image (screen). This requirement makes it even more difficult to correct the lateral color of the lens. Similarly, the requirement for a long back focal length also makes it more difficult to correct lateral color.

Achieving a short focal length (e.g., a focal length of around 30 millimeters), a long back focal length (e.g., a back focal length which is at least as long as the lens' focal length), a wide field of view in the direction of the lens' long conjugate (e.g., a field of view of at least 50°), and an aperture stop close to the short conjugate side of the lens, while still maintaining the high level of aberration correction needed for a projection lens system which employs pixelized panels is particularly challenging since these various requirements tend to work against one another. To do so while minimizing the number of lens elements used in the lens so as to control the cost and weight of the lens is even more demanding. As discussed and illustrated below, the present invention provides projection lenses which satisfy these conflicting criteria.

SUMMARY OF THE INVENTION

In view of the foregoing, there exists a need in the art for projection lenses for use with pixelized panels which have some and preferably all of the following properties:

(1) an aperture stop near to the short conjugate side of the lens;
(2) a high level of lateral color correction, including correction of secondary lateral color;
(3) low distortion;
(4) a large field of view in the direction of the image;
(5) a long back focal length (BFL);
(6) a short focal length; and
(7) a minimum number of lens elements.

To satisfy this need in the art, the invention provides projection lenses which have some and preferably all of the above seven features.

In particular, the invention provides a projection lens having a power $\Phi_0$ and consisting in order from the lens' long conjugate side to its short conjugate side of:

(A) a first lens unit (U1) having a power $\Phi_{U1}$ and comprising at least one aspheric surface; and
(B) a second lens unit (U2) having a power $\Phi_{U2}$ and consisting in order from the lens' long conjugate side to its short conjugate side of:
  (i) a first lens subunit ($U_{S1}$) having a power $\Phi_{S1}$;
  (ii) a second lens subunit ($U_{S2}$) having a power $\Phi_{S2}$ and an overall meniscus shape which is concave towards the short conjugate; and
  (iii) a third lens subunit ($U_{S3}$) having a power $\Phi_{S3}$ and a surface $S_3$ at its long conjugate side;
  wherein:
  (a) $\Phi_{U1}<0$;
  (b) $\Phi_{U2}>0$;
  (c) $\Phi_{S1}>0$;
  (d) $\Phi_{S2}<0$;
  (e) $\Phi_{S3}>0$;
  (f) $BFL \cdot \Phi_0 \geq 1.0$; and
  (g) the lens' aperture stop is either within the third lens subunit or spaced from surface $S_3$ in the direction of the long conjugate by a distance D which satisfies the relationship:

$D \cdot \Phi_0 \leq 0.1$.

Preferably, the $BFL \cdot \Phi_0$ product is greater than or equal to 1.2 and the $D \cdot \Phi_0$ product is equal to or less than 0.05.

In addition to having the above $BFL \cdot \Phi_0$ and $D \cdot \Phi_0$ products, the projection lenses of the invention preferably have a field of view θ in the direction of the long conjugate of at least 50° and preferably greater than 55°. Also, the projection lenses of the invention preferably have eight or less lens elements, e.g., seven lens elements, where doublets are treated as two lens elements. Considering doublets as a single component, the projection lenses of the invention preferably have six or less components, e.g., five components.

BRIEF DESCRIPTION OF THE DRAWINGS

The foregoing drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention.

DESCRIPTION OF THE PREFERRED EMBODIMENTS

The projection lenses of the present invention are of the retrofocus or the inverted telephoto type and consist of two lens units, i.e., a negative unit (U1) on the long conjugate side and a positive unit (U2) on the short conjugate side. As illustrated by the examples presented below, this overall lens form allows the lenses to achieve a long back focal length and a wide field of view in the direction of the lens' long conjugate.

The lenses of the invention achieve a high level of distortion correction by using one or more aspherical surfaces in the first lens unit. Preferably, the aspherical surfaces are formed on one or more plastic lens elements.

Most preferably, the lens includes only one plastic lens element with the rest of the lens elements being composed of glass. See commonly-assigned U.S. Pat. No. 5,870,228. In particular, the lens elements of the second lens unit carry the full aperture beam and preferably contain only spherical glass surfaces in order to maintain high levels of surface accuracy and thermal stability.

The plastic lens element or elements of the first lens unit are preferably made of moldable acrylic to provide the appropriate dispersion for the minimization of secondary lateral color. See commonly-assigned PCT Patent Publication No. WO 00/67059 entitled "Projection Lenses Having Reduced Lateral Color for Use with Pixelized Panels." See also commonly-assigned U.S. Pat. No. 5,625,495.

As discussed above, the location of the lens' aperture stop near the lens' short conjugate side makes it difficult to correct the lens' "odd" aberrations. One approach to this problem is to employ extensive vignetting at the long conjugate end of the lens. Such an approach, however, results in a significant loss of light output and is unacceptable for a practical projection lens system.

In accordance with the invention, a high level of aberration correction without extensive vignetting is achieved through the overall structure of the lens in combination with the appropriate distribution of optical power among the various units and subunits making up the lens. In particular, it has been found that the lens should satisfy some and preferably all of the following relationships:

$|\Phi_{U1}|/\Phi_0 \geq 0.7$ (preferably $\geq 0.9$);

$\Phi_{U2}/\Phi_0 \geq 0.8$ (preferably $\geq 0.9$);

$\Phi_{S1}/\Phi_0 \geq 0.8$ (preferably $\geq 0.9$); and $\Phi_{S2+S3}/\Phi_0 \leq 0.6$ (preferably $\leq 0.5$), where $\Phi_{S2+S3}$ is the combined optical power of the second and third lens subunits.

Without intending to limit it in any manner, the present invention will be more fully described by the following examples.

EXAMPLES

FIGS. 1–4 and Tables 1–4 illustrate representative projection lenses constructed in accordance with the invention.

OHARA designations are used for the various glasses employed in the lens systems. Equivalent glasses made by other manufacturers (e.g., HOYA or SCHOTT) can be used in the practice of the invention. Industry acceptable materials are used for the plastic elements.

The aspheric coefficients set forth in the tables are for use in the following equation:

$$z = \frac{cy^2}{1 + [1 - (1+k)c^2 y^2]^{1/2}} + Dy^4 + Ey^6 + Fy^8 + Gy^{10} + Hy^{12} + Iy^{14}$$

where z is the surface sag at a distance y from the optical axis of the system, c is the curvature of the lens at the optical axis, and k is a conic constant, which is zero except where indicated in the prescriptions of Tables 1–4.

The designation "a" associated with various surfaces in the tables represents an aspherical surface, i.e., a surface for which at least one of D, E, F, G, H, or I in the above equation is not zero; and the designation "c" indicates a surface for which k in the above equation is not zero.

The various planar structures located on the short conjugate side of U2 in the figures and tables represent components which are used with or are a part of the pixelized panel. They do not constitute part of the projection lens. The material designations for the planar structures of Tables 1 and 2 are set forth as six digit numbers, where an $N_e$ value for the material is obtained by dividing the first three digits of the designation by 1,000 and adding 1.000, and a $V_e$ value is obtained from the last three digits by placing a decimal point before the last digit.

Surface 7 in each of Tables 1 and 2, and surfaces 5 and 9 in Table 4 are vignetting surfaces. All dimensions given in Tables 1–4 are in millimeters. The powers given in Table 5 are in inverse millimeters. The distances given in Table 7 are in millimeters and the angles are in degrees. The negative values for D and D•$\Phi_0$ for Example 4 in Table 7 indicates that the aperture stop is within the third lens subunit. It should be noted that the magnitude of the EXP values in Tables 1–4 and the BFL values in Table 7 are substantially the same, e.g., $|EXP| \approx 1.1 \cdot BFL$.

The abbreviations used in the prescription tables are as follows:

| | |
|---|---|
| EFL | effective focal length |
| FVD | front vertex distance |
| f/ | f-number (finite conjugates) |
| ENP | entrance pupil as seen from the long conjugate |
| EXP | exit pupil as seen from the long conjugate |
| BRL | barrel length |
| OBJ HT | object height |
| MAG | magnification |
| STOP | location of aperture stop |
| IMD | image distance |
| OBD | object distance |
| OVL | overall length. |

The prescription tables are constructed on the assumption that light travels from left to right in the figures. In actual practice, the viewing screen will be on the left and the pixelized panel will be on the right, and light will travel from right to left. In particular, the references in the prescription tables to objects/images and entrance/exit pupils are reversed from that used in the rest of the specification. The pixelized panel is shown in the FIGS. 1–4 by the designation "PP" and the aperture stop is shown by the designation "AS".

The powers of the various lens units and subunits making up the projection lenses of Tables 1–4 are set forth in Table 5 with the various power ratios discussed above being listed in Table 6. Table 7 sets forth D, D•$\Phi_0$, BFL and BFL•$\Phi_0$ values for these lenses. As can be seen from Tables 6 and 7, all of the lenses satisfy the desired relationships discussed above. In particular, all of the preferred values for these relationships are satisfied by Examples 1 and 2.

In addition to the properties shown in Tables 6 and 7, the projection lenses of the invention preferably also have the following properties:

(i) a lateral color blur at full field for wavelengths in the range from 460 nanometers to 620 nanometers which is less than a pixel and preferably less than three-quarters of a pixel (note that the level of lateral color correction can be determined at the object plane or the image plane, a magnified pixel being used when the determination is performed at the image plane); and (ii) a distortion which is less than 1.5 percent and preferably less than or equal to 1.0 percent.

The projection lenses of Tables 1–4 achieve both of the foregoing preferred lateral color and preferred distortion levels. In particular, the lenses achieve the preferred level of lateral color correction for a pixel size (pixel width) of less than 15 microns.

Although specific embodiments of the invention have been described and illustrated, it is to be understood that a variety of modifications which do not depart from the scope and spirit of the invention will be evident to persons of ordinary skill in the art from the disclosure herein. The following claims are intended to cover the specific embodiments set forth herein as well as such modifications, variations, and equivalents.

TABLE 1

| Surf. No. | Type | Radius | Thickness | Glass | Clear Aperture Diameter |
|---|---|---|---|---|---|
| 1 | a | 55.2357 | 3.80000 | ACRYLIC | 35.94 |
| 2 | a | 16.0691 | 10.00000 | | 28.60 |
| 3 | | 48.2900 | 3.00000 | S-TIH6 | 27.61 |
| 4 | | 25.5900 | 10.28000 | | 25.86 |
| 5 | | 49.1350 | 5.70000 | S-LAH58 | 27.89 |
| 6 | | −59.5680 | 7.66000 | | 27.56 |
| 7 | | ∞ | 9.50000 | | 20.33 |
| 8 | | 72.5900 | 3.80000 | S-LAH64 | 18.00 |
| 9 | | −28.3550 | 1.60000 | S-FTM16 | 17.62 |
| 10 | | 24.1760 | 1.94000 | | 16.24 |
| 11 | | Aperture stop | 0.20000 | | 16.19 |
| 12 | | 102.9940 | 5.10000 | S-LAL12 | 16.15 |
| 13 | | −13.9300 | 1.50000 | LAH78 | 16.01 |
| 14 | | −28.2500 | 33.20446 | | 16.50 |
| 15 | | ∞ | 2.74300 | 472630 | 32.00 |
| 16 | | ∞ | 0.73700 | | 32.00 |

Symbol Description a - Polynomial asphere

Even Polynomial Aspheres

| Surf. No. | D | E | F | G | H | I |
|---|---|---|---|---|---|---|
| 1 | 6.6347E−06 | −6.4194E−08 | 1.5275E−10 | 1.5031E−13 | −1.7083E−15 | 2.6184E−18 |
| 2 | 8.3317E−06 | −1.6864E−07 | 4.9685E−10 | −2.1025E−12 | 9.6817E−16 | −1.5449E−17 |

System First Order Properties

OBJ. HT: −1762.8    f/    2.36    MAG:    −0.0088
STOP:   0.00 after surface 11.   DIA:   16.190
EFL:    29.0945    FVD:    100.764    ENP:    29.6219
IMD:    0.737001    BRL:    100.027    EXP:    −39.4727
OBD:    −3295.47    OVL:    3396.23

TABLE 2

| Surf. No. | Type | Radius | Thickness | Glass | Clear Aperture Diameter |
|---|---|---|---|---|---|
| 1 | a | 65.7461 | 3.80000 | ACRYLIC | 36.16 |
| 2 | a | 17.5651 | 9.93713 | | 28.68 |
| 3 | | 49.1937 | 3.00000 | S-FTM16 | 27.61 |
| 4 | | 25.1336 | 10.16757 | | 25.89 |
| 5 | | 37.7823 | 6.80000 | S-LAH58 | 26.81 |
| 6 | | −73.4555 | 7.19145 | | 25.85 |
| 7 | | ∞ | 4.50000 | | 18.14 |
| 8 | | 64.1712 | 4.70000 | S-FPL51 | 16.45 |
| 9 | | −20.7804 | 1.40000 | S-TIH10 | 15.76 |
| 10 | | 31.8208 | 1.40000 | | 15.33 |
| 11 | | Aperture stop | 1.20000 | | 15.45 |
| 12 | | −35.6966 | 2.70000 | S-YGH52 | 15.56 |
| 13 | | −25.8663 | 0.10000 | | 16.72 |
| 14 | | 111.3154 | 3.00000 | S-LAH59 | 18.13 |
| 15 | | −43.2547 | 33.51852 | | 18.71 |
| 16 | | ∞ | 2.74300 | 472630 | 32.00 |
| 17 | | ∞ | 0.73642 | | 32.00 |

Symbol Description a - Polynomial asphere

Even Polynomial Aspheres

| Surf. No. | D | E | F | G | H | I |
|---|---|---|---|---|---|---|
| 1 | 1.8998E−05 | −7.1981E−08 | 5.2166E−11 | 3.5907E−13 | −1.0814E−15 | 9.2754E−19 |
| 2 | 2.5992E−05 | −8.1054E−08 | −1.0307E−10 | −1.9572E−13 | 5.0155E−15 | −1.8970E−17 |

TABLE 2-continued

System First Order Properties

| | | | | | | | |
|---|---|---|---|---|---|---|---|
| OBJ. HT: | −1670.0 | f/ | 2.36 | MAG: | −0.0090 | | |
| STOP: | 0.00 after surface 11. | | DIA: | 15.412 | | | |
| EFL: | 28.9428 | | FVD: | 96.8941 | | ENP: | 29.1422 |
| IMD: | 0.736418 | | BRL: | 96.1577 | | EXP: | −40.5808 |
| OBD: | −3207.07 | | OVL: | 3303.97 | | | |

TABLE 3

| Surf. No. | Type | Radius | Thickness | Glass | Clear Aperture Diameter |
|---|---|---|---|---|---|
| 1 | a | 67.3287 | 3.50000 | ACRYLIC | 34.06 |
| 2 | ac | 21.1411 | 9.69574 | | 27.68 |
| 3 | ac | 90.0000 | 3.00000 | ACRYLIC | 25.13 |
| 4 | | 30.6606 | 13.50839 | | 23.29 |
| 5 | | 45.8740 | 4.30000 | S-LAH58 | 21.34 |
| 6 | | −67.0558 | 9.24086 | | 20.74 |
| 7 | | 113.1872 | 3.70000 | S-BAL35 | 16.85 |
| 8 | | −22.4396 | 1.80000 | PBH1 | 16.44 |
| 9 | | 30.9075 | 0.40000 | | 15.86 |
| 10 | | Aperture stop | 2.51527 | | 15.73 |
| 11 | | −79.7792 | 3.00000 | S-LAH58 | 16.32 |
| 12 | | −29.6325 | 0.20000 | | 17.00 |
| 13 | | 314.4573 | 3.50000 | S-LAR58 | 17.29 |
| 14 | | −30.3488 | 1.50000 | S-TIH23 | 17.57 |
| 15 | | −101.0404 | 33.00000 | | 17.87 |
| 16 | | ∞ | 2.74000 | SIO2 | 32.00 |
| 17 | | ∞ | 1.00032 | | 32.00 |

Symbol Description a - Polynomial asphere
c - Conic section

Even Polynomial Aspheres

| Surf. No. | D | E | F | G | H | I |
|---|---|---|---|---|---|---|
| 1 | 3.9278E−05 | −8.4110E−08 | −1.5235E−10 | 2.5697E−12 | −8.1789E−15 | 8.1235E−18 |
| 2 | 5.5369E−05 | −1.1560E−07 | 1.2888E−09 | −1.5932E−11 | 1.1919E−13 | −3.2312E−16 |
| 3 | −1.0970E−05 | −1.8534E−07 | 3.1771E−09 | −3.3508E−11 | 1.8182E−13 | −4.2458E−16 |

Conic Constants

| | |
|---|---|
| Surface 2 | k = −4.8482E−01 |
| Surface 3 | k = −7.0000E+00 |

System First Order Properties

| | | | | | | | |
|---|---|---|---|---|---|---|---|
| OBJ. HT: | −1250.0 | f/ | 2.40 | MAG: | −0.0120 | | |
| STOP: | 0.00 after surface 10. | | DIA: | 15.732 | | | |
| EFL: | 29.0083 | | FVD: | 96.6006 | | ENP: | 28.1390 |
| IMD: | 1.00032 | | BRL: | 95.6003 | | EXP: | −43.0638 |
| OBD: | −2408.43 | | OVL: | 2505.03 | | | |

TABLE 4

| Surf. No. | Type | Radius | Thickness | Glass | Clear Aperture Diameter |
|---|---|---|---|---|---|
| 1 | a | 88.4662 | 3.50000 | ACRYLIC | 35.00 |
| 2 | a | 15.1048 | 19.04346 | | 27.40 |
| 3 | | 41.9522 | 5.90000 | S-LAM66 | 27.00 |
| 4 | | −75.5701 | 6.35075 | | 26.00 |
| 5 | | ∞ | 4.00000 | | 18.33 |
| 6 | | 32.6795 | 4.50000 | S-PHM53 | 16.27 |
| 7 | | −33.0612 | 1.60000 | S-TIH53 | 15.43 |
| 8 | | 25.9957 | 0.90000 | | 14.66 |
| 9 | | ∞ | 1.00000 | | 14.65 |
| 10 | | −32.5784 | 5.00000 | S-LAH58 | 14.66 |
| 11 | | −25.9460 | 1.71927 | | 16.12 |
| 12 | | 164.8941 | 3.20000 | S-LAH58 | 17.34 |
| 13 | | −51.4227 | 33.15000 | | 18.00 |

TABLE 4-continued

| | | | | | |
|---|---|---|---|---|---|
| 14 | ∞ | 2.75000 | ZKN7 | | 32.00 |
| 15 | ∞ | 0.80338 | | | 32.00 |

Symbol Description a - Polynomial asphere

Even Polynomial Aspheres

| Surf. No. | D | E | F | G | H | I |
|---|---|---|---|---|---|---|
| 1 | 2.4598E−05 | −1.3986E−07 | 2.6745E−10 | 6.1203E−13 | −3.8796E−15 | 5.2238E−18 |
| 2 | 2.5828E−05 | −1.6619E−07 | −4.2448E−10 | 7.0690E−13 | 1.6323E−14 | −1.1161E−16 |

System First Order Properties

| | | | | | |
|---|---|---|---|---|---|
| OBJ. HT: −1690.0 | f/ | 2.40 | MAG: | −0.0090 | |
| STOP: | 1.50 after surface 10. | DIA: | 15.293 | | |
| EEL: | 28.9889 | FVD: | 93.4169 | ENP: | 26.5146 |
| IMD: | 0.803376 | BRL: | 92.6135 | EXP: | −41.0095 |
| OBD: | −3214.65 | OVL: | 3308.06 | | |

TABLE 5

| Example | $\Phi_0$ | $\Phi_{u1}$ | $\Phi_{u2}$ | $\Phi_{s1}$ | $\Phi_{s2}$ | $\Phi_{s3}$ | $\Phi_{s2+s3}$ |
|---|---|---|---|---|---|---|---|
| 1 | .0343 | −.0389 | .0341 | .0322 | −.0060 | .0224 | .0162 |
| 2 | .0346 | −.0340 | .0334 | .0346 | −.0259 | .0361 | .0149 |
| 3 | .0345 | −.0280 | .0334 | .0320 | −.0240 | .0328 | .0133 |
| 4 | .0345 | −.0267 | .0313 | .0292 | −.0195 | .0329 | .0167 |

TABLE 6

| Example | $|\Phi_{U1}|/\Phi_0$ | $\Phi_{U2}/\Phi_0$ | $\Phi_{S1}/\Phi_0$ | $\Phi_{S2+S3}/\Phi_0$ |
|---|---|---|---|---|
| 1 | 1.134 | .994 | .939 | .472 |
| 2 | .982 | .965 | 1.000 | .431 |
| 3 | .812 | .968 | .928 | .386 |
| 4 | .774 | .907 | .846 | .484 |

TABLE 7

| Example | D | D · $\Phi_0$ | BFL | BFL · $\Phi_0$ | θ |
|---|---|---|---|---|---|
| 1 | 0.20 | 0.01 | 36.7 | 1.26 | 56 |
| 2 | 1.20 | 0.04 | 37.0 | 1.28 | 56 |
| 3 | 2.52 | 0.09 | 36.7 | 1.27 | 56 |
| 4 | −1.50 | −0.05 | 36.7 | 1.27 | 56 |

What is claimed is:

1. A projection lens having an aperture stop, an optical axis, a long conjugate side, a short conjugate side, a power $\Phi_0$, and a back focal length BFL, said projection lens being adapted to form an image of a pixelized panel and consisting in order from said long conjugate side to said short conjugate side of:
   (A) a first lens unit having a power $\Phi_{U1}$ and comprising at least one aspheric surface; and
   (B) a second lens unit having a power $\Phi_{U2}$ and consisting in order from said long conjugate side to said short conjugate side of:
       (i) a first lens subunit having a power $\Phi_{S1}$;
       (ii) a second lens subunit having a power $\Phi_{S2}$ and an overall meniscus shape which is concave towards the short conjugate; and
       (iii) a third lens subunit having a power $\Phi_{S3}$ and a surface $S_3$ at its long conjugate side;

wherein:
   (a) $\Phi_{U1}<0$;
   (b) $\Phi_{U2}>0$;
   (c) $\Phi_{S1}>0$;
   (d) $\Phi_{S2}<0$;
   (e) $\Phi_{S3}>0$;
   (f) BFL·$\Phi_0 \geq 1.0$; and
   (g) the aperture stop is either within the third lens subunit or spaced from surface $S_3$ in the direction of the long conjugate by a distance D which satisfies the relationship:
   D·$\Phi_0 \leq 0.1$.

2. The projection lens of claim 1 wherein:

D·$\Phi_0 \leq 0.05$.

3. The projection lens of claim 1 wherein:

BFL·$\Phi_0 \geq 1.2$.

4. The projection lens of claim 1 wherein:

$|\Phi_{U1}|/\Phi_0 \geq 0.7$; and $\Phi_{U2}/\Phi_0 \geq 0.8$.

5. The projection lens of claim 1 wherein:

$|\Phi_{U1}|/\Phi_0 \geq 0.9$; and $\Phi_{U2}/\Phi_0 \geq 0.9$.

6. The projection lens of claim 1 wherein the second and third lens subunits have a combined optical power $\Phi_{S2+S3}$ and wherein:

$\Phi_{S1}/\Phi_0 \geq 0.8$; and $\Phi_{S2+S3}/\Phi_0 \leq 0.6$.

7. The projection lens of claim 1 wherein the second and third lens subunits have a combined optical power $\Phi_{S2+S3}$ and wherein:

$\Phi_{S1}/\Phi_0 \geq 0.9$; and $\Phi_{S2+S3}/\Phi_0 \leq 0.5$.

8. The projection lens of claim 1 wherein the first lens unit comprises at least one negative lens element having an overall meniscus shape which is convex towards the long conjugate side.

9. The projection lens of claim 1 wherein the first lens unit consists of two negative lens elements, each of which has an overall meniscus shape which is convex towards the long conjugate side.

10. The projection lens of claim 1 wherein the first lens subunit consists of a biconvex lens element.

11. The projection lens of claim 1 wherein the second lens subunit consists of a doublet.

12. The projection lens of claim 1 wherein the third lens subunit consists of a doublet.

13. The projection lens of claim 1 wherein the projection lens consists of eight or less lens elements.

14. The projection lens of claim 1 wherein the projection lens consists of seven lens elements.

15. The projection lens of claim 1 wherein:
   (i) the projection lens has a field of view θ in the direction of the long conjugate side of the lens; and
   (ii) θ satisfies the relationship:
      θ>50°.

16. A projection lens system comprising:
   (a) a pixelized panel; and
   (b) the projection lens of claim 1.

17. The projection lens system of claim 16 further comprising an illumination system which has an optical axis which intersects the projection lens' optical axis at an acute angle.

* * * * *

UNITED STATES PATENT AND TRADEMARK OFFICE
CERTIFICATE OF CORRECTION

PATENT NO.    : 6,476,974 B1
DATED         : November 5, 2002
INVENTOR(S)   : Kreitzer, Melvyn H.

It is certified that error appears in the above-identified patent and that said Letters Patent is hereby corrected as shown below:

<u>Column 9,</u>
Line 26, delete "S-LAR58" and insert in place thereof -- S-LAH58 --.

<u>Column 11,</u>
Line 19, delete "EEL:" and insert in place thereof -- EFL: --.
Line 27, delete "$\Phi_0 \quad \Phi_{u1} \quad \Phi_{u2} \quad \Phi_{s1} \quad \Phi_{s2} \quad \Phi_{s3} \quad \Phi_{s2+s3}$" and insert in place thereof -- $\Phi_0 \quad \Phi_{U1} \quad \Phi_{U2} \quad \Phi_{S1} \quad \Phi_{S2} \quad \Phi_{S3} \quad \Phi_{S2+S3}$ --.

Signed and Sealed this

Seventh Day of October, 2003

JAMES E. ROGAN
*Director of the United States Patent and Trademark Office*